3,097,969
STARCH PRODUCT
Gertrude A. Roscelli, Columbus, Ohio, assignor to National Industrial Products Company, Columbus, Ohio
Filed Feb. 10, 1960, Ser. No. 7,823
9 Claims. (Cl. 127—33)

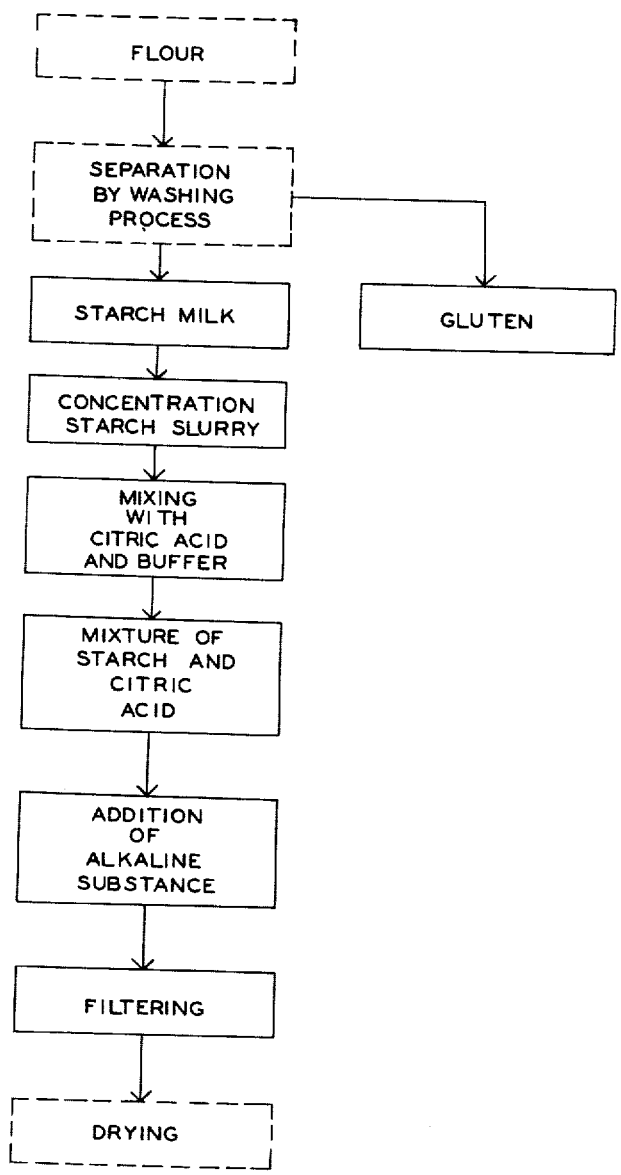

The invention disclosed and claimed in this application relates to starch and to processes of treating starch, and is illustrated by embodiments consisting of starches which have high viscosities and to processes for forming such starches.

In the production of starch for many purposes it is highly desirable that a high viscosity be maintained.

In the process of the separation of starch from gluten and the purification of starch, various chemicals have heretofore been used. Many of the chemicals heretofore used have an adverse effect upon viscosity.

One of the objects of my invention therefore is the production of a starch having an extra thick cooked paste viscosity.

A further object of my invention is the provision of a new process of producing a starch having an extra thick cooked paste viscosity.

Other features and objects of my invention will be apparent from the following specification and claims.

The drawing hereof is a flow sheet illustrating a process of producing such a high viscosity starch according to one embodiment of my invention.

I have made an extensive investigation of the chemicals heretofore used in the treatment of starch. Of these prior art chemicals, many reduce or otherwise destroy the capability of starches to maintain a high viscosity or chemically combine to form a product having an extra thick cooked paste viscosity. Others are of such nature that their presence in foods is harmful.

In the drawing I have illustrated a preferred process which is an embodiment of my invention. Therein a starch milk (approximately 5% starch solids) after being separated from flour by a washing process, and usually concentrated to a starch slurry having 33-37% starch solids, is mixed with about 0.03% benzaldehyde and then the starch is filtered and dried. My copending application Serial No. 2,426, filed January 14, 1960, now U.S. Patent No. 3,036,936, is directed to the combination of benzaldehyde with starch. The starch could obviously be separated by other processes. However, in order to obtain a high viscosity starch no sulfur dioxide ($SO_2$) should be used in the process. In my improved process I add citric acid together with a buffer such as sodium citrate to produce a product having an extra thick cooked paste viscosity.

I have not determined that the citric acid or the sodium citrate chemically combines with the starch, but I believe that they do. The citric acid does in all normal cases react with the sodium citrate.

Temperatures of from 117° F. to 122° F. are very important and might even be considered critical inasmuch as at higher temperatures the starch swells too much and at lower temperatures the desired effect is delayed. The Baumé of the slurry should be at about 20 and the pH at about 7. However, I prefer later to adjust the pH to about 5.5.

The following examples are embodiments of the practice of my invention:

*Example I*

I obtained a concentrated starch slurry by separating the starch and gluten components of a high grade flour in washing troughs. The starch milk having a pH of 6 to 7 was pumped through lines free of $SO_2$ gas over a series of filters, for further cleaning, and through centrifuges where the starch milk was concentrated to 19 to 21° Bé. (33 to 37% solids). The concentrated starch was passed through a heat exchanger until the starch attained a temperature of at least 117° F. and collected in a tank for treatment. I started the agitator and added 0.03% (based on dry weight of starch) benzaldehyde. I then dry blended 0.5% of citric acid and 1% sodium citrate based on the dry weight of starch and added this to the starch-benzaldehyde slurry. The pH dropped to about 4.5. I then adjusted the pH to about 5.5 by addition of sodium carbonate. I recirculated the slurry through a heat exchanger to maintain the temperature of the slurry in the tank at least 117° F. and not more than 122° F. The slurry was held between these temperatures for 4 hours. The starch was free of thermophilic bacteria. I checked the slurry viscosity by the Keever modified Scott viscosity test (explained below) and found it equivalent to 45 seconds for a 7-ounce/gallon starch having 12% moisture. The starch was then filtered and dried and showed a Keever Scott viscosity of 48 seconds for a 6-oz./gal. starch having 12% moisture. On the evidence of the change in Scott viscosity as well as infra red analysis, I inferred that there was a reaction between the citric acid and the starch which presumably occurs upon removal of water from the starch during the filtering and drying processes.

*Example II*

I obtained a concentrated starch slurry by separating the starch and gluten components of a high grade flour in washing troughs. The starch milk having a pH of 6 to 7 was pumped through lines free of $SO_2$ gas over a series of filters, for further cleaning, and through centrifuges where the starch milk was concentrated to 19-21° Bé. (33 to 37% solids). The concentrated starch was passed through a heat exchanger until the starch attained a temperature of at least 117° F. and collected in a tank for treatment. I started the agitator and added 0.01% (based on dry weight of starch) benzaldehyde. I then dry blended 0.5% of citric acid and 1% sodium citrate based on the dry weight of starch and added this to the starch-benzaldehyde slurry. The pH dropped to about 4.5. I then adjusted the pH to about 5.5 by addition of sodium carbonate. I recirculated the slurry through a heat exchanger to maintain the temperature of the slurry in the tank at least 117° F. and not more than 122° F. The slurry was held between these temperatures for 5 hours. The starch was free of thermophilic bacteria. I checked the slurry viscosity by the Keever modified Scott viscosity test (explained below) and found it equivalent to 45 seconds for a 7-oz./gal. starch having 12% moisture. The starch was then filtered and dried and showed a Keever Scott viscosity of 48 seconds for a 6-oz./gal, starch having 12% moisture.

*Example III*

I obtained a concentrated starch slurry by separating the starch and gluten components of a high grade flour in washing troughs. The starch milk having a pH of 6 to 7 was pumped through lines free of $SO_2$ gas over a series of filters, for further cleaning, and through centrifuges where the starch milk was concentrated to 19 to 21° Bé. (33 to 37% solids). The concentrated starch was passed through a heat exchanger until the starch attained a temperature of at least 117° F. and collected in a tank for treatment. I started the agitator and added 0.05% (based on dry weight of starch) benzaldehyde. I then dry blended 0.5% of citric acid and 1% sodium citrate based on the dry weight of starch and added this to the starch-benzaldehyde slurry. The pH dropped to about 4.5. I then adjusted the pH to about 5.5 by addition of sodium carbonate. I recirculated the slurry through a heat exchanger to maintain the temperature of the slurry in the tank at least 117° F. and not more than 122° F. The slurry was held between these temperatures for 3 hours. The starch was free of thermophilic bacteria. I checked the slurry viscosity by the Keever modified Scott viscosity test (explained below) and found it equivalent to 45 seconds for a 7-oz./gal. starch having 12% moisture. The starch was then filtered and dried and showed a Keever Scott viscosity of 48 seconds for a 6-oz./gal. starch having 12% moisture.

*Example IV*

I obtained a concentrated starch slurry be separating the starch and gluten components of a high grade flour in washing troughs. The starch milk having a pH of 6 to 7 was pumped through lines free of $SO_2$ gas over a series of filters, for further cleaning, and through centrifuges where the starch milk was concentrated to 10 to 21° Bé. (33 to 37% solids). The concentrated starch was passed through a heat exchanger until the starch attained a temperature of at least 117° F. and collected in a tank for treatment. I started the agitator and added 0.03% (based on dry weight of starch) benzaldehyde.

I then dry blended 0.5% of citric acid and 1% sodium benzoate based on the dry weight of starch and added this to the starch-benzaldehyde slurry. The pH dropped to about 4.5. I then adjusted the pH to about 5.5 by addition of sodium carbonate. I recirculated the slurry through a heat exchanger to maintain the temperature of the slurry in the tank at least 117° F. and not more than 122° F. The slurry was held between these temperatures for 4 hours. The starch was free of thermophilic bacteria. I checked the slurry viscosity by the Keever modified Scott viscosity test (explained below) and found it equivalent to 45 seconds for a 7-oz./gal. starch having 12% moisture. The starch was then filtered and dried and showed a Keever Scott viscosity of 48 seconds for a 6-oz./gal. starch having 12% moisture.

The following table gives the varied data of other examples which are embodiments of the practice of my invention in which the procedure was the same as in Examples I–IV inclusive except for the variables listed in the table.

| Example No. | Percent of benz-aldehyde | Percent of citric acid | Percent of sodium citrate | Percent of sodium benzoate | Time of slurry treatment, hours | Scott viscosity |
|---|---|---|---|---|---|---|
| V | 0.03 | 0.10 | 0.20 | | 4 | 45 sec./6.4 oz./gal. |
| VI | 0.01 | 0.10 | 0.20 | | 5 | 45 sec./6.4 oz./gal. |
| VII | 0.05 | 0.10 | 0.20 | | 3 | 45 sec./6.4 oz./gal. |
| VIII | 0.03 | 0.10 | | 0.20 | 4 | 45 sec./6.4 oz./gal. |
| IX | 0.03 | 0.20 | 0.40 | | 4 | 45 sec./6.3 oz./gal. |
| X | 0.01 | 0.20 | 0.40 | | 5 | 45 sec./6.3 oz./gal. |
| XI | 0.05 | 0.20 | 0.40 | | 3 | 45 sec./6.3 oz./gal. |
| XII | 0.03 | 0.20 | | 0.40 | 4 | 45 sec./6.3 oz./gal. |
| XIII | 0.03 | 0.40 | 0.80 | | 4 | 45 sec./6.2 oz./gal. |
| XIV | 0.01 | 0.40 | 0.80 | | 5 | 47 sec./6.2 oz./gal. |
| XV | 0.05 | 0.40 | 0.80 | | 3 | 45 sec./6.2 oz./gal. |
| XVI | 0.03 | 0.40 | | 0.80 | 4 | 45 sec./6.2 oz./gal. |

In all of the above examples the treated starch at the end of the treatment was free of thermophilic bacterion. In each case, as well as in Examples I–IV inclusive, I inferred, based on the evidence of the change in Scott viscosity and the infra red analysis made, that there was a reaction between the citric acid and the starch which occurs upon the removal of water from the starch during the filtering and drying processes.

The citric acid-sodium citrate method described above is a method which I have invented for insuring the maintenance of a high viscosity throughout the life of the starch. However, my invention of the benzaldehyde starch and the process of making the benzaldehyde-starch is independent of the method of increasing the viscosity of the starch and can be used with my citric acid sodium citrate method or with any other method of increasing or maintaining a high viscosity starch.

Starch treated with benzaldehyde in the proportions specified above is entirely free of thermophilic bacteria and remains free thereof throughout any reasonable handling time.

The Keever Scott viscosity test is a test for measuring the viscosity of starch. The Keever method for Scott viscosity is defined as the measurement of the concentration of starch to the finished gallon (brought to the boiling point under 20 lbs. of steam pressure in approximately 20 seconds and held at the boiling point for 20 minutes under ½ lb. steam pressure), that will deliver 100 cc. of cooked paste in 45 seconds through an accurately calibrated orifice. The number of ounces of starch to the gallon of water at the time of the test gives the viscosity or fluidity of the starch. Thus a 6-oz. starch has a high viscosity, a 7-oz. starch a lower viscosity and an 18-oz. starch a very low viscosity.

It is to be understood that the above described embodiments of my invention are for the purpose of illustration only and various changes may be made without departing from the spirit and scope of my invention.

I claim:

1. A process of producing an extra thick cooked paste high viscosity stabilized starch which comprises mixing citric acid with the starch at a temperature of from 117° F. to 122° F.

2. A process of producing an extra thick paste high viscosity stabilized starch which comprises:
   forming a starch slurry;
   mixing with such starch slurry up to 0.5% of citric acid based upon the dry weight of the starch;
   maintaining the mixture as a starch citric acid slurry at a temperature of from 117° F. to 122° F. for a period of from 3 to 16 hours;
   filtering; and
   drying.

3. The process of claim 2 in which the citric acid is mixed in the amount of about 0.5% by weight based on the dry weight of the starch.

4. The process of claim 2 in which the slurry is maintained free of $SO_2$.

5. The process of claim 2 in which the slurry is obtained during the manufacturing process in which the starch is separated from the gluten portion of the flour.

6. The process of claim 2 in which there is also mixed with the starch and citric acid from 0.01 to 0.05% of benzaldehyde by weight based on the dry weight of the starch.

7. The process of claim 2 in which the starch-citric acid slurry is maintained at a pH at least as high as 4.5 by adding about 1.0% by weight of sodium citrate based on the dry weight of the starch.

8. A composition of matter consisting of the product of the process defined in claim 2.

9. A composition of matter consisting of the product of the process of forming a starch slurry;
   mixing with such starch slurry up to 0.5% citric acid by weight based upon the dry weight of the starch and from 0.01 to 0.05% of benzaldehyde by weight based on the dry weight of the starch;
   maintaining the mixture as a starch, citric acid, benzaldehyde slurry at a temperature of from 117° F. to 122° F. for a period of from 3 to 16 hours; filtering; and drying.

References Cited in the file of this patent

UNITED STATES PATENTS

| | | |
|---|---|---|
| 2,328,537 | Felton et al. | Sept. 7, 1943 |
| 2,805,220 | Gerwitz | Sept. 3, 1957 |
| 2,806,026 | Evans | Sept. 10, 1957 |
| 3,036,936 | Roscelli | May 29, 1962 |

FOREIGN PATENTS

| | | |
|---|---|---|
| 566,236 | Great Britain | Dec. 20, 1944 |
| 584,681 | Great Britain | Jan. 21, 1947 |

OTHER REFERENCES

"The Effect of Citric Acid on Selected Starches and Flours," Food Research, vol. 19, pp. 581–9 (1954).

UNITED STATES PATENT OFFICE
CERTIFICATE OF CORRECTION

Patent No. 3,097,969　　　　　　　　　　　　　July 16, 1963

Gertrude A. Roscelli

It is hereby certified that error appears in the above numbered patent requiring correction and that the said Letters Patent should read as corrected below.

Column 3, line 14, for "be" read -- by --; line 73, for "bacterion" read -- bacteria --.

Signed and sealed this 3rd day of March 1964.

(SEAL)
Attest:

ERNEST W. SWIDER
Attesting Officer

EDWIN L. REYNOLDS

Acting Commissioner of Patents